United States Patent [19]

Inskeep, Jr.

[11] Patent Number: 4,571,301
[45] Date of Patent: Feb. 18, 1986

[54] METHOD AND APPARATUS FOR CLEANING CHEMICAL/WATER SOLUTIONS

[76] Inventor: Eugene L. Inskeep, Jr., 20320 - 14th Ave. West, Lynnwood, Wash. 98036

[21] Appl. No.: 652,749

[22] Filed: Sep. 19, 1984

[51] Int. Cl.⁴ .............................................. B01D 23/24
[52] U.S. Cl. .................................. 210/788; 210/304; 210/794; 210/798; 210/805; 210/806
[58] Field of Search .............. 210/304, 788, 794, 798, 210/805, 806

[56] References Cited

U.S. PATENT DOCUMENTS

| | | | |
|---|---|---|---|
| 3,034,904 | 5/1962 | Kleinman | 99/154 |
| 3,335,868 | 8/1967 | Schiffers | 210/304 |
| 3,376,142 | 4/1968 | Goonewardene | 99/154 |
| 3,404,778 | 10/1968 | Woodruff | 209/211 |
| 3,431,200 | 3/1969 | Davis | 210/10 |
| 3,444,077 | 5/1969 | Finch | 210/304 |
| 3,526,518 | 9/1970 | Kleinman | 99/154 |
| 3,526,519 | 9/1970 | Kleinman | 99/154 |
| 3,698,555 | 10/1972 | Conner | 210/304 |
| 3,723,309 | 3/1973 | Garcia | 210/788 |
| 3,907,686 | 9/1975 | Fletcher et al. | 210/259 |
| 3,979,524 | 9/1976 | Bayne | 426/305 |
| 3,989,628 | 11/1976 | Bier | 210/788 |
| 4,077,880 | 3/1978 | Lorenz | 210/65 |
| 4,113,616 | 9/1978 | Kaes | 210/304 |
| 4,123,558 | 10/1978 | Poapst | 426/268 |
| 4,168,231 | 9/1979 | Allen | 210/74 |
| 4,168,232 | 9/1979 | Allen | 210/74 |
| 4,331,691 | 5/1982 | Poovalah | 426/302 |
| 4,336,232 | 6/1982 | Moritz | 210/794 |
| 4,378,289 | 3/1983 | Hunter | 209/211 |
| 4,399,041 | 8/1983 | Rappe | 210/787 |
| 4,447,322 | 5/1984 | Zajdlik | 210/304 |

FOREIGN PATENT DOCUMENTS 1112309 5/1968 United Kingdom ............... 210/304

*Primary Examiner*—Tim Miles
*Attorney, Agent, or Firm*—Delbert J. Barnard

[57] ABSTRACT

Dirty diphenylamine solution is pumped from a reservoir (12) first through a cyclone separator (28) and then through a media filter (50) and back to the reservoir (12). A first large flow rate pump (30) is used to cause flow through the cyclone separator (28). A second lower capacity pump (52) pumps a portion of the solution that is delivered out through the cyclone separator (28) into the inlet (48) of the media filter (50). The remaining portion of the outflow from the cyclone separator (28) is directly returned to the reservoir (12). Fresh water via a conduit (78) and then compressed air via a conduit (82) are flushed through the filter (50), to wash chemical out from the filter (50) and carry it into the reservoir (12). Then, fresh water is directed back in the reverse direction through filter (50), to backwash the filter (50). The water used for backwashing is dumped via conduit (90).

18 Claims, 2 Drawing Figures

METHOD AND APPARATUS FOR CLEANING CHEMICAL/WATER SOLUTIONS

DESCRIPTION

1. Technical Field

The present invention relates to the provision of a method and apparatus for cleaning a chemical/water solution, to remove from the solution both heavier than water and lighter than water particulate impurities, for the purpose of increasing the use life of the chemical solution.

2. Background Art

The apparatus and process of the present invention were developed for use in cleaning a particular chemical solution which has for several years been used for treating applies to prevent, control and/or retard the development of apple scald. This particular solution is a solution of water and diphenylamine (simply termed "DPA").

In the treatment of apples, the DPA solution is sprayed onto the apples while they are in large boxes. In a typical installation, a plurality of the boxes are transported into a position over a grate covered collector tank or reservoir. The solution is sprayed onto the apples and the boxes at a large enough flow rate that the solution fills the boxes and floats the apples in the boxes before draining down into the reservoir. This manner of applying the solution to the apples results in the solution picking up dirt and other particulate impurities from the apples, from the boxes that the apples are in, and from the apparatus used for transporting the boxes of apples. The particulate impurities that enter into the solution are both high density impurities (specific gravity larger than water) and low density impurities (specific gravity lower than water).

Prior to the present invention it was the practice to merely discard the DPA solution after a few uses. The solution would be recycled to some extent, but without cleaning. Thus, when it was determined that the solution was probably too dirty for further use, it was discarded. This practice constituted a costly waste of the solution and also caused disposal problems.

As mentioned above, the apparatus and process of this invention were developed initially to provide a way of cleaning DPA solution, to increase the amount of times this solution could be used for treating apples before it need be discarded. However, as will be seen, the apparatus and process of this invention can be used for cleaning many types of chemical solutions which are apt to become dirty during use in the same manner that the DPA solution becomes dirty when it is used for coating apples.

The use of Diphenylamine (DPA) in the treatment of apples, for controlling the development of storage scald of the apples, is disclosed by the following U.S. Pat. Nos. 3,034,904, granted May 15, 1962, to Morton Kleiman; 3,376,142, granted Apr. 2, 1968, to Hilary F. Goonewardene; 3,526,518 granted Sept. 1, 1970, to Morton Kleiman; and 3,526,519, granted Sept. 1, 1970, to Morton Kleiman.

The following patents, relating to various types of particle separators, filter systems, and/or solution cleaning systems, should be consulted for the purpose of putting the subject invention into proper perspective relative to the prior art: U.S. Pat. No. 3,404,778, granted Oct. 8, 1968, to Maurice D. Woodruff and Timothy T. Cowhey; U.S. Pat. No. 3,431,200, granted Mar. 4, 1969, to Noah S. Davis and Oren J. Foust; U.S. Pat. No. 3,907,686, granted Sept. 23, 1975, to James C. Fletcher et al; U.S. Pat. No. 4,077,880, granted Mar. 7, 1978, to Jurgen Lorenz and Frank Mehdorn; U.S. Pat. No. 4,168,231, granted Sept. 18, 1979, to Mark K. Allen and Roland S. Weber; U.S. Pat. No. 4,168,232, granted Sept. 18, 1979, to Mark K. Allen and Roland S. Weber; U.S. Pat. No. 4,378,289, granted Mar. 29, 1983, to A. Bruce Hunter; and U.S. Pat. No. 4,399,041, granted Aug. 16, 1983, to Gerald C. Rappe.

DISCLOSURE OF THE INVENTION

The invention relates to a method and apparatus for use in conjunction with a system in which a chemical/water solution is used in a way resulting in high and low density particulate impurities entering into the solution. The present invention relates to a method and apparatus for removing these impurities from the solution, to in that manner clean the solution for reuse.

Basically, the method of the present invention comprises collecting the used solution in a reservoir. Then, the solution is pumped from the reservoir into the inlet of a cyclone separator. A primary flow of the solution is directed from an upper first outlet of the cyclone separator to and through a media filter. High density particles are removed from the solution in the cyclone separator. They fall down through the cyclone separator, by gravity, and exit through a lower second outlet of the cyclone separator. The low density particles are removed from the solution in the media filter.

In accordance with an aspect of the invention, solution is pumped from the reservoir to and through the cyclone separator at a first flow rate, to determine a flow rate of solution flow out through the upper or main solution outlet of the cyclone separator. A smaller capacity pump is used for pumping some of this solution into the inlet of the media filter. The excess flow is returned to the reservoir.

The heavy particles which fall down through the lower outlet of the cyclone filter, and some solution, are collected in a container. The heavy particles are allowed to settle to the bottom of the container. The solution is allowed to collect in the container until its upper surface reaches the level of an overflow pipe. Then, the solution flows through the pipe back into the reservoir. When the container becomes sufficiently full of heavy particulate material, it is replaced by a new container. The full container is taken and dumped somewhere.

According to another aspect of the invention, the solution in the reservoir is continuously stirred up or agitated, so that the particles are always in solution. The outflow from the media filter is returned to the reservoir. The solution is circulated and recirculated from the reservoir, to and through the cyclone separator, to and through the media filter, and back to the reservoir, until the contents of the reservoir are sufficiently clean for reuse.

In accordance with yet another aspect of the invention, the media filter is periodically cleaned. The cleaning procedure involves first flushing fresh water through the filter, in the filtering direction, for the purpose of washing the chemical off the particles in the filter bed. The water used for this washing is directed back to the reservoir, so that the chemical will not be lost. Then, compressed air is directed through the media filter, for the purpose of purging the filter of the chemical. Next, fresh water is directed back through the media filter, in the reverse direction, to backwash the filter, and wash from it the impurities. The backwash water and the impurities are discarded.

The detailed description of the preferred mode, and the appended claims, set forth additional details of the invention and are themselves part of the description of the invention.

BRIEF DESCRIPTION OF THE DRAWINGS

In the drawings, like reference numerals are used to designate like parts throughout, and.

BEST MODE FOR CARRYING OUT THE INVENTION

Figure 1:
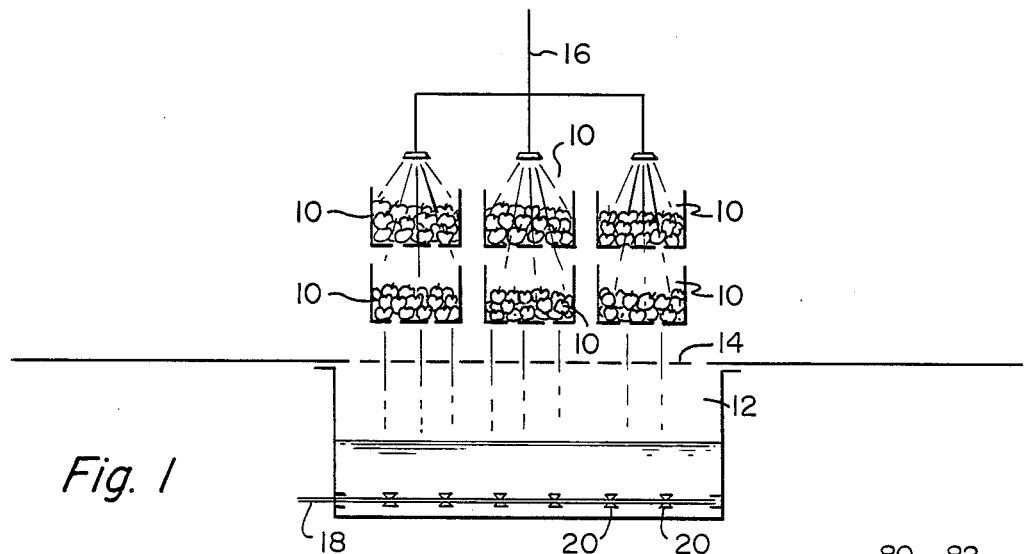
FIG. 1 is a diagrammatic view of several boxes of apples in the process of being sprayed by a DPA solution, such boxes being positioned over a reservoir into which the used solution falls and is collected.

Referring to FIG. 1, in a typical installation, in which a DPA solution is applied to apples, the apples are transported in boxes 10 to a position above a reservoir or tank 12. Reservoir 12 is covered by a foraminous grate 14. A plurality of the boxes 10 are transported together into a position above the grate 14. A spraying system 16 is used for spraying the DPA solution onto the apples. The DPA solution is delivered into the boxes 10 at a sufficient flow rate to cause the apples to float in the boxes 10. In the process the apples are thoroughly coated with the DPA solution. The DPA solution then falls down through the boxes and then through openings in grate 14 into the reservoir 12.

The reservoir 12 preferably includes an agitator 18, shown in the form of a rotating shaft on which a plurality of paddles 20 are secured. Of course, the agitator does not have to be constructed in this matter but could take many different forms.

Figure 2:
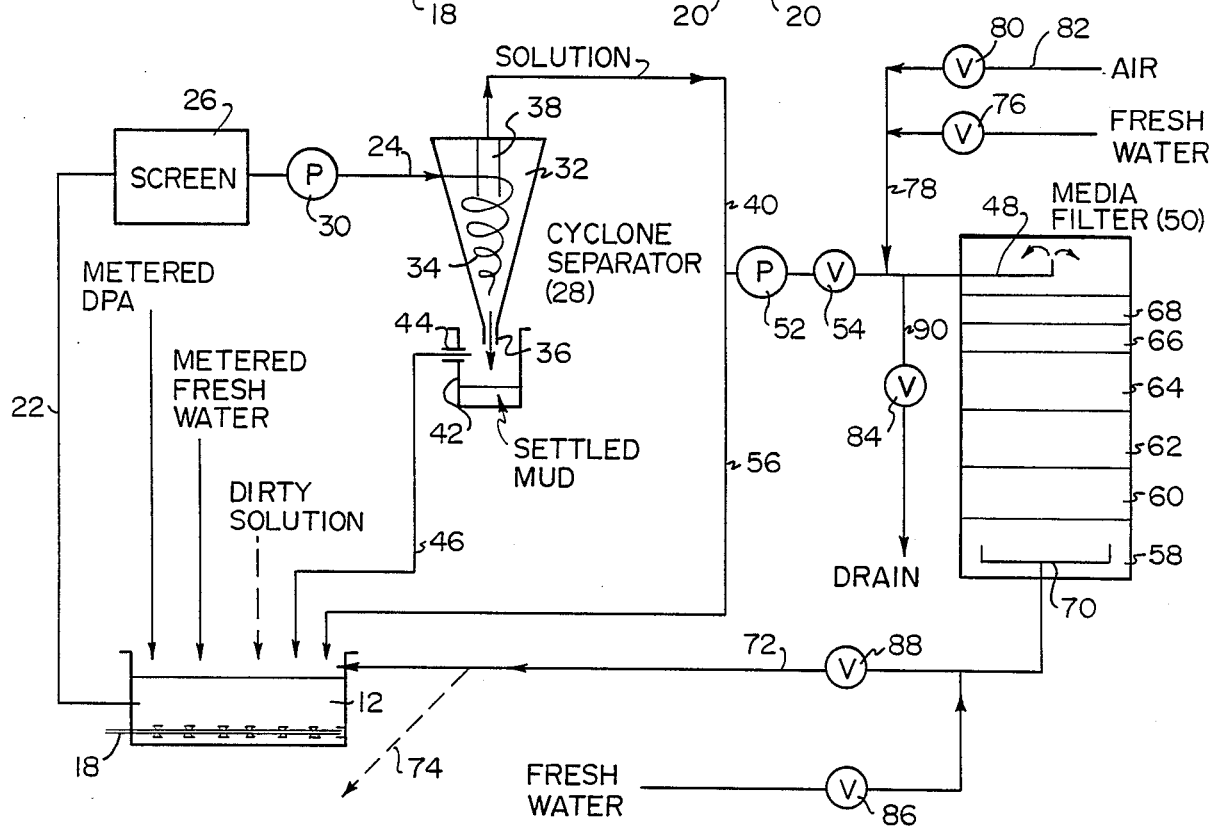
FIG. 2 is a schematic view of an embodiment of the chemical/water solution cleaning system of the present invention.

Referring to FIG. 2, the cleaning system of the present invention comprises a first conduit 22 which extends from the reservoir 12 to the inlet 24 of a cyclone separator 28. Conduit 22 includes a screen 26 for removing leaves, gravel, etc. which if not removed could damage and/or plug parts of the system downstream of the screen 26. Screen 26 is manually cleaned once a day. Screen 26 may simply be a sheet of thin aluminum in which holes have been formed.

Conduit 22 also includes a pump 30. Pump 30 pumps the dirty solution from reservoir 12, through the screen 26, and into and through the cyclone separator 28. Cyclone separator 28 may be like the cyclone separator disclosed by the aforementioned U.S. Pat. No. 3,404,778.

Cyclone separator 28 comprises a conical body 32. The inlet 24 enters body 32 at a tangent, so as to cause the flow to rotate, as shown by the flow indicia 34. As the solution rotates, the particles in it which are heavier than water settle out and fall out through a lower outlet 36. The primary flow is upwardly, through a primary outlet 38, into a second conduit 40.

Some solution flows out through outlet 36, together with the heavy particulate materials. This solution and the heavy particulate materials are collected in a settlement container 42. The heavy particles are allowed to settle in the bottom of the container 42. An outlet 44 is provided near the upper end of the container 42. When the solution in container 42 reaches the level of outlet 44, it overflows through a conduit 46, back into the reservoir 12. When the container 42 is substantially full of settled material or "mud", it is replaced by a new empty container 42. The full container is taken out and dumped. The containers 42 may simply be large metal drums (e.g. fifty-five gallon drums) which can easily be picked up and moved.

Conduit 40 extends over to the inlet 48 of a media filter 50. Conduit 40 includes a second pump 52 and a shut-off valve 54 located between pump 52 and the media inlet 48.

By design, pump 52 is chosen to have a lower flow rate than the pump 30, and also a lower flow rate than the flow of solution out through conduit 40. As a result, pump 52 will only pump a portion of the flow from outlet 38 of cyclone separator 28 into the media filter inlet 48. The remaining or excess flow is returned to the reservoir 12, by way of conduit 56.

Media filter 50 may be a sand filter. However, in preferred form, it is a multi-layer filter. By way of typical, and therefore non-limited example, it may include a first bottom layer 58 of one-half inch road gravel. Above this there is a layer 60 of one-eighth inch by one-quarter inch crust flint. Above the flint layer 60 there is a layer 62 of eight-twelve mesh garnet. This means that one-hundred percent of the garnet material will pass through a size eight mesh filter. Ninety percent will be retained on a size twelve mesh filter. Above the garnet layer 62 there is a layer 64 of thirty-forty mesh garnet filter material. This means that one-hundred percent of garnet particles will pass through a size thirty filter and ninety percent will be retained on a size forty mesh filter.

Above layer 64 there is a layer 66 of 0.45 micron silica sand. Above the sand layer 66 there is layer 68 of 0.75 micron charcoal.

Inlet 48 delivers the solution from conduit 40 into the upper region of the filter 50. The solution then flows by gravity down through the filter bed materials 68, 66, 64, 62, 60, 58, and is collected by a collector 70 from which it flows into a conduit 72.

The cleaned solution in conduit 72 may be directed out through a conduit 74, to a place of use. However, in preferred form, it is delivered by conduit 72 back into the reservoir 12.

In preferred form, when it is desired to clean the solution in reservoir 12, the agitator 18 is operated, to continuously stir up the solution in reservoir 12 and keep the particles in suspension. Then, the pumps 30, 52 are operated to pump solution from reservoir 12, to and through the cyclone separator 28, and then to and through the media filter 50, and from media filter 50 back into the reservoir 12. The solution is circultated and recirculated through the system until the contents of reservoir 12 are sufficiently clean for reuse.

Media filter 50 is cleaned periodically with fresh water. As a first step to cleaning, shut-off valve 54 is closed. Then, a fresh water valve 76 is opened. Fresh water is directed through conduit 78 into the filter inlet 48. This fresh water flows through the filter 50, and then through conduit 72 into the reservoir 12. Preferably, after filter 50 has been washed by fresh water, valve 76 is closed, and a valve 80 in air line 82 is opened, and compressed air is directed through conduit 78 into the filter inlet 48. The compressed air purges the filter of the chemical which is in the solution, and carries it through conduit 72 into reservoir 12.

Following the air purge, the air valve 80 is closed. At this time valves 54, 76, 84 and 86 are also closed, and valve 88 is open. Next, valve 88 is closed, valve 84 is opened and then valve 86 is opened, to allow fresh water to flow backwards to the filter. This backwash of the filter causes the filter particles to float upwardly. Impurities deposited on the filter particles are washed off and are carried by the water the water out through the inlet 48, into conduit 90. Conduit 90 leads to a drain. The water flowing through conduit 90 is discarded.

During backwash, the large pieces of gravel do not move. It is only the smaller pieces which are forced upwardly. The various layers settle back to their original positions because each upper layer is lighter (i.e. has a smaller specific gravity) than the layer below it.

Following the backwash, valves 80 and 84 are opened while valves 54, 76, 86, and 88 are closed. This step amounts to an air purge of conduit 90.

Following this air purge, valves 80 and 84 are closed, valves 54 and 88 are opened, and the filter system is ready for use.

Initially, fresh water and a metered amount of DPA are put into the reservoir 12, to provide in the reservoir 12 a chemical solution of proper strength. The introduction of water and DPA into reservoir 12 can be regulated so that the quantity of DPA added is always proportional to the quantity of water added. The reservoir 12 may be fitted with a float to keep the level up. The float may operate to automatically add the proper quantity of water and DPA to the reservoir, wehn additional solution is needed.

It may be desirable to substitute a single multi-port valve for the various valves 54, 76, 80, 84, 86, 88. The particular valving is not a part of the invention, so individual valves have been shown.

Clogging of the passageways in the filter material will cause the pressure in the upper region of the filter to rise. Thus a pressure guage may be used for automatically determining when the filter 50 needs to be cleaned.

As will be apparent, various details of the system may vary, including details of the apparatus used, the make-up of the media filter, and the sequence of the various steps of the process. The above description is offered for purposes of illustration, not limitation. I am only to be limited by the terms of the following claims and the rules of claim interpretation.

What is claimed is:

1. In a system in which a chemical/water solution is used in a way resulting in high and low density particulate impurities entering into the solution, a method of cleaning the solution for reuse, comprising:
    collecting the used solution in a reservoir;
    pumping used solution from the reservoir into the inlet of a cyclone separator;
    directing a primary solution flow out from an upper first outlet of the cyclone separator to and through a media filter, for removal of low density particles from the solution;
    removing high density particles from the solution in the cyclone separator, out from a lower second outlet of the cyclone separator;
    removing cleaned solution from the media filter;
    reusing the cleaned solution; and
    pumping used solution from the reservoir to the inlet of the cyclone separator at a first flow rate, pumping primary solution flow from the first outlet of the cyclone separator into the media filter at a second flow rate which is lower than the flow rate of the primary solution out from the first outlet of the cyclone separator, resulting in only a portion of the primary solution flow from the cyclone separator being directed into the media filter, and directing the remaining portion of the primary solution flow back into the reservoir.

2. A method according to claim 1, comprising pumping the used solution from the reservoir first to and through a screen, for screening out large particles, and from the screen to the inlet of the cyclone separator.

3. A method according to claim 1, comprising collecting in a container the high density particles and some solution which flows with the high density particles out from the second outlet of the cyclone separator, allowing the high density particles to settle to the bottom of the container, and flowing the solution out from an upper
    portion of the container back to the reservoir.

4. A method according to claim 3, comprising directing the cleaned solution from the media filter back into the reservoir.

5. A method according to claim 4, comprising agitating the solution that is in the reservoir while pumping solution out from the reservoir to and through the cyclone separator and to and through the media filter, and continuing flow of the solution from the reservoir, to and through the cyclone separator, to and through the media filter, and back to the reservoir, until the solution in the reservoir is sufficiently clean for reuse.

6. In a system in which a chemical/water solution is used in a way resulting in high and low density particulate impurities entering into the solution, a method of cleaning the solution for reuse, comprising:
    collecting the used solution in a reservoir;
    pumping used solution from the reservoir into the inlet of a cyclone separator;
    directing a primary solution flow out from an upper first outlet of the cyclone separator to and through a media filter, for removal of low density particles from the solution;
    removing high density particles from the solution in the cyclone separator, out from a lower second outlet of the cyclone separator;
    removing cleaned solution from the media filter;
    reusing the cleaned solution; and
    collecting in a container the high density particles and some solution which flows with the high density particles out from the second outlet of the cyclone separator, allowing the high density particles to settle to the bottom of the container, and flowing the solution out from an upper portion of the container back to the reservoir.

7. A method according to claim 6, comprising directing the cleaned solution from the media filter back into the reservoir.

8. A method according to claim 7, comprising agitating the solution that is in the reservoir while pumping solution out from the reservoir to and through the cyclone separator and to and through the media filter, and continuing flow of the solution from the reservoir, to and through the cyclone separator, to and through the media filter, and back to the reservoir, until the solution in the reservoir is sufficiently clean for reuse.

9. A method according to claim 6, comprising directing the cleaned solution from the media filter back into the reservoir.

10. A method according to claim 9, comprising agitating the solution that is in the reservoir while pumping solution out from the reservoir to and through the cyclone separator and to and through the media filter, and continuing flow of the solution from the reservoir, to and through the cyclone separator, to through the media filter, and back to the reservoir, until the solution in the reservoir is sufficiently clean for reuse.

11. In a system in which a chemical/water solution is used in a way resulting in high and low density particulate impurities entering into the solution, a method of cleaning the solution for reuse, comprising:
   collecting the used solution in a reservoir;
   pumping used solution from the reservoir into the inlet of a cyclone separator;
   directing a primary solution flow out from an upper first outlet of the cyclone separator to and through a media filter, for removal of low density particles from the solution;
   removing high density particles from the solution in the cyclone separator, out from a lower second outlet of the cyclone separator;
   removing cleaned solution from the media filter;
   reusing the cleaned solution; and
   cleaning the media filter by first ceasing flow of solution through the filter, then directing fresh water through the media filter in the filtering direction, and directing such water out from the filter into the solution reservoir.

12. A method according to claim 11, further comprising flowing compressed air through the media filter in the filtering direction, following the flow of fresh water through the media filter.

13. A method according to claim 12, comprising backwashing the filter following the flow of air through the filter, by flowing fresh water through the filter in the opposite direction to filtering flow, from the normal outlet of the filter to and through the normal inlet of the filter, and discarding such water after it flows out from the filter.

14. For use in conjunction with a system in which a chemical/water solution is used in a way resulting in high and low density particulate impurities entering into the solution, apparatus for cleaning the solution for reuse, comprising:
   a reservoir for the used solution;
   a cyclone separator having an inlet, an upper first outlet, and a lower second outlet;
   a first conduit leading from the reservoir to the inlet of the cyclone separator;
   a first pump in said first conduit, for pumping used solution out from the reservoir, through the first conduit and into the inlet of the cyclone separator;
   a media filter having an inlet and an outlet;
   a second conduit leading from the first outlet of the cyclone separator to the inlet of the media filter;
   a second pump in the second conduit, for pumping primary solution which flows out through the first outlet of the cyclone separator, into the inlet of the media filter;
   container means in communication with the second outlet of the cyclone separator, for receiving high density particles which settle out in the cyclone separator and fall down through the second outlet;
   conduit means for leading cleaned solution from the outlet of the media filter;
   wherein the pump in the first conduit pumps solution at a first flow rate, and the pump in the second conduit pumps solution at a flow rate which is lower than the flow rate of primary solution out from the first outlet of the cyclone separator, resulting in only a portion of the primary solution flow from the cyclone separator being directed into the media filter; and
   a third conduit for receiving the remaining portion of the primary solution flow and directing it back into the reservoir.

15. Apparatus according to claim 14, wherein the conduit means which is connected to the outlet of the media filter, and out through which cleaned solution flows, is connected to direct such cleaned solution into the reservoir.

16. For use in conjunction with a system in which a chemical/water solution is used in a way resulting in high and low density particulate impurities entering into the solution, apparatus for cleaning the solution for reuse, comprising:
   a reservoir for the used solution;
   a cyclone separator having an inlet, an upper first outlet, and a lower second outlet;
   a first conduit leading from the reservoir to the inlet of the cyclone separator;
   a first pump in said first conduit, for pumping used solution out from the reservoir, through the first conduit and into the inlet of the cyclone separator;
   a media filter having an inlet and an outlet;
   a second conduit leading from the first outlet of the cyclone separator to the inlet of the media filter;
   a second pump in the second conduit, for pumping primary solution which flows out through the first outlet of the cyclone separator, into the inlet of the media filter;
   container means in communication with the second outlet of the cyclone separator, for receiving high density particles which settle out in the cyclone separator and fall down through the second outlet;
   conduit means for leading cleaned solution from the outlet of the media filter;
   wherein the conduit means which is connected to the outlet of the media filter, and out through which cleaned solution flows, is connected to direct such cleaned solution into the reservoir; and
   a shut-off valve in the second conduit leading from the first outlet of the cyclone separator to the inlet of the media filter, and conduit means between said shut-off valve and the inlet of the filter, for delivering fresh water into the inlet of the filter, so that the shut-off valve can be closed and the fresh water can be directed through the media filter, for washing the solution out from the filter and into the reservoir.

17. Apparatus according to claim 16, further comprising means for directing compressed air into the inlet of the media filter, while the shut-off valve is closed, so that the compressed air will flow through the media filter, in the filtering direction, and push out additional solution, and carry such additional solution to the reservoir.

18. For use in conjunction with a system in which a chemical/water solution is used in a way resulting in high and low density particulate impurities entering into the solution, apparatus for cleaning the solution for reuse, comprising:
   a reservoir for the used solution;
   a cyclone separator having an inlet, an upper first outlet, and a lower second outlet;

a first conduit leading from the reservoir to the inlet of the cyclone separator;

a first pump in said first conduit, for pumping used solution out from the reservoir, through the first conduit and into the inlet of the cyclone separator;

a media filter having an inlet and an outlet;

a second conduit leading from the first outlet of the cyclone separator to the inlet of the media filter;

a second pump in the second conduit, for pumping primary solution which flows out through the first outlet cyclone separator, into the inlet of the media filter;

container means in communication with the second outlet of the cyclone separator, for receiving high density particles which settle out in the cyclone separator and fall down through the second outlet;

conduit means for leading cleaned solution from the outlet of the media filter;

wherein the conduit means which is connected to the outlet of the media filter, and out through which cleaned solution flows, is connected to direct such cleaned solution into the reservoir;

a shut-off valve in the second conduit leading from the first outlet of the cyclone separator to the inlet of the media filter;

conduit means between said shut-off valve and the inlet of the filter, for delivering fresh water into the inlet of the filter, so that the shut-off valve can be closed and the fresh water can be directed through the media filter, for washing the solution out from the filter and into the reservoir;

means for delivering fresh water into the outlet end of the media filter, so that the fresh water will flow through the filter in the reverse direction, and carry with it impurities which are in the filter; and drain means connected with the second conduit which leads into the filter, said drain means being downstream of the shut-off valve, said drain means including a drain valve, so that the shut-off valve can be closed and the drain valve open, while water is being flowed back through the filter, for cleaning the filter of impurities.

* * * * *